United States Patent [19]

Buysch et al.

[11] Patent Number: 4,920,166

[45] Date of Patent: Apr. 24, 1990

[54] FLAME-RESISTANT, ANTISTATIC POLYCARBONATE MOLDING COMPOSITIONS

[75] Inventors: Hans-Josef Buysch; Norbert Schön, both of Krefeld, Fed. Rep. of Germany; Hans-Jürgen Kress, Pittsburgh, Pa.; Herbert Eichenauer, Dormagen; Josef Buekers, Krefeld, both of Fed. Rep. of Germany

[73] Assignee: Bayer Aktiengesellschaft, Leverkusen-Bayerwerk, Fed. Rep. of Germany

[21] Appl. No.: 348,397

[22] Filed: May 8, 1989

Related U.S. Application Data

[63] Continuation of Ser. No. 175,343, Mar. 31, 1988, abandoned.

[30] Foreign Application Priority Data

Apr. 17, 1987 [DE] Fed. Rep. of Germany ....... 3713164
Apr. 17, 1987 [DE] Fed. Rep. of Germany ....... 3713157
Aug. 15, 1987 [DE] Fed. Rep. of Germany ....... 3727251

[51] Int. Cl.$^5$ ........................... C08K 5/53; C08K 5/52
[52] U.S. Cl. .................................... 524/141; 524/142; 524/139; 524/288; 524/377; 524/378; 524/911
[58] Field of Search ............... 524/141, 142, 377, 378, 524/911, 139

[56] References Cited

U.S. PATENT DOCUMENTS

| | | | |
|---|---|---|---|
| 3,264,202 | 8/1966 | King | 528/425 |
| 3,544,487 | 12/1970 | Dunlop et al. | 528/408 |
| 4,649,168 | 3/1987 | Kress et al. | 524/132 |
| 4,692,488 | 9/1987 | Kress et al. | 524/139 |
| 4,751,260 | 6/1988 | Kress et al. | 525/67 |
| 4,839,421 | 6/1989 | Buysch et al. | 525/67 |

FOREIGN PATENT DOCUMENTS

| | | |
|---|---|---|
| 0135802 | 8/1984 | European Pat. Off. . |
| 0174493 | 3/1986 | European Pat. Off. . |
| 0207369 | 1/1987 | European Pat. Off. . |
| 59-142243 | 8/1984 | Japan . |
| 59-49284 | 10/1985 | Japan . |
| 59-193941 | 4/1986 | Japan . |

*Primary Examiner*—Veronica P. Hoke
*Attorney, Agent, or Firm*—Connolly and Hutz

[57] ABSTRACT

The invention relates to flame-resistant mixtures of polycarbonates with graft polymers and copolymers which are characterized in that they contain modified polyalkylene ethers as antistatic agent.

10 Claims, No Drawings

FLAME-RESISTANT, ANTISTATIC POLYCARBONATE MOLDING COMPOSITIONS

This is a continuation of application Ser. No. 175,343 filed Mar. 31, 1988, abandoned.

This invention relates to flame-resistant, antistatic molding compositions containing A. 20 to 90 parts by weight of a thermoplastic aromatic polycarbonate, B. 0 to 50 parts by weight of a graft polymer of B.1. 5 to 90 parts by weight and preferably 30 to 80 parts by weight of a mixture of B.1.1. 50 to 95% by weight styrene, α-methyl styrene, nucleus-substituted styrene, methyl methacrylate or mixtures thereof and B.1.2. 50 to 5% by weight (meth)acrylonitrile, methyl methacrylate, maleic anhydride, N-substituted maleic imide or mixtures thereof, on B.2. 95 to 10 parts by weight and preferably 70 to 20 parts by weight of a rubber having a glass transition temperature $T_G$ of $\leq 10°$ C., C. 5 to 70 parts by weight of a thermoplastic copolymer of C.1. 50 to 95% by weight styrene, α-methyl styrene, nucleus-substituted styrene, methyl methacrylate or mixtures thereof and C.2. 50 to 5% by weight (meth)acrylonitrile, methyl methacrylate, maleic anhydride, N-substituted maleic imide or mixtures thereof, D. 0 to 15 parts by weight of a low molecular weight or high molecular weight halogen compound, more especially a bromine compound, based on 100 parts by weight of A.+C.+D. and, optionally, B., the halogen content resulting from components A.+D. being between 3 and 10% by weight, based on the total weight of components A. and D., E. 1 to 20 parts by weight and preferably 2 to 15 parts by weight, based on 100 parts by weight A.+C. and, optionally, B. and/or D., of a phosphorus compound corresponding to the following formula

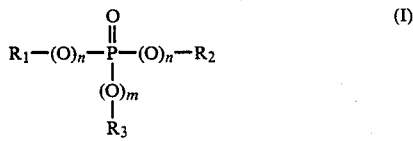

$$R_1-(O)_n-\underset{\underset{R_3}{\overset{(O)_m}{|}}}{\overset{\overset{O}{\|}}{P}}-(O)_n-R_2 \qquad (I)$$

in which
$R_1$, $R_2$ and $R_3$ independently of one another are an optionally halogenated $C_1$–$C_8$ alkyl or an optionally halogenated $C_6$–$C_{20}$ aryl and
n and m independently of one another have the value 0 or 1, F. 0.05 to 1.0 part by weight and more especially 0.1 to 0.5 part by weight, based on 100 parts by weight A.+C. and, optionally, B. and/or D., of a tetrafluoroethylene polymer having average particle sizes of 0.05 to 1000 μm and a density of 1.2 to 2.3 g/cm³, component F. preferably being used in the form of a coagulated mixture of emulsions of the tetrafluoroethylene polymers F. having an average particle size of 0.05 to 20 μm and a density of 1.2 to 1.9 g/cm³ with emulsions of graft polymers B. and the ratio by weight of graft polymer B. to the tetrafluoroethylene polymer F. being between 95:5 and 60:40 and the content of optionally additional quantities of B., based on 100 parts by weight of A.+C. and, optionally, B. and/or D., being between 0.1 and 4.0 parts by weight, and G. 0.2 to 5.0 parts by weight and preferably 1.0 to 3.0 parts by weight, based on 100 parts by weight of the sum of A. to G., of a polyalkylene ether modified by a radical former and, optionally, effective quantities of stabilizers, pigments, flow aids and mold release agents.

According to DE-OS 2 228 072, thermoplastic polycarbonates are flameproofed with a mixture of hexabromobenzene and an antimony compound which may additionally contain a phosphate ester as synergist. However, the sole addition of 10 parts by weight triphenylphosphate to bisphenol A polycarbonate has no antidrip effect in the flame test according to U.L. Subj. 94 (see page 20 of DE-OS 2,228,072).

DE-OS 2,434,085 describes foamable thermoplastic plastics, mentioning inter alia polycarbonates, polymers or mixtures thereof as thermoplasts. The polymers mentioned also include those of butadiene, styrene and acrylonitrile or of styrene alone. The foamable plastics may contain phosphate esters, optionally in combination with halogen compounds, as flameproofing agents. Polytetrafluoroethylene polymers are not among the halogen compounds recommended.

US-PS 4,355,126 and US-PS 4,107,232 describe inter alia flame-resistant ABS polymers containing polytetrafluoroethylenes. Triphenylphosphate is particularly preferred as the flameproofing agent.

DE-OS 2,921,325 describes the addition of pentaerythritol diphosphates and diphosphonates as flameproofing agents for polycarbonates which may be used in conjunction with halogen compounds including —according to page 9 of DE-OS 2,921,325 from the cited US-PS 3,392,136—polyvinylidene fluorides. ABS copolymers may be mixed with the polycarbonates. However, since the phosphates or phosphonates corresponding to general formula (I) as sole additives to a PC/ABS mixture do not produce a VO in 1.6 mm, it would appear that the subject of the present invention cannot be derived from this literature reference.

DE-OS 2,903,100 and DE-OS 2,918,883 describe flame-resistant mixtures of polycarbonates, ABS polymers and halogen compounds. According to DE-OS 2,903,100, flame resistance is achieved through special organic sulfonates. Fluorinated polyolefins may be added as anti-drip agents. According to DE-OS 2,918,883, flame resistance is achieved through alkali or alkaline earth salts of acids in combination with antidrip agents, the quantity of ABS polymers being at most only 10% by weight, based on the mixture as a whole.

According to EP-OS 0,074,112, phosphate esters are added as plasticizers to polycarbonate/ABS mixtures. Diphenyl octylphosphate is mentioned as one example of a suitable phosphate ester. There is no reference to the addition of fluorinated polyolefins.

GB-PS 1,459,648 describes flame-resistant, non-dripping polymers, for example of ABS polymers or of polycarbonates, in which a flameproofing additive, such as for example triphenylphosphate, a non-inflammable fibrous material and polytetrafluoroethylene resin, has been incorporated. Example 2 of GB-PS 1,459,648 shows that, without the fibrous material, the polytetrafluoroethylene resin does not prevent dripping. Flame-resistant polymer mixtures containing polyphosphates having $\overline{M}_w$ values of 1600 to 150,000 in quantities of from 1 to 35% by weight in addition to polytetrafluoroethylenes and organic halogen compounds are also known (EP-OS 0,103,230). However, the polycarbonates of these molding compositions are largely synthesized from tetramethylated diphenols.

Accordingly, these molding compositions have the disadvantage that they have a distinctly lower level of mechanical properties than the present molding compositions. In addition, the use of polyphosphates in PC/ABS molding compositions based on a polycarbonate which does not contain any alkylated diphenols leads to an inadequate flameproofing effect.

DE-OS 3,322,260 describes flame-resistant thermoplastic molding compositions containing
a. aromatic polycarbonates,
b. SAN graft polymers,
c. thermoplastic polymers,
d. optionally halogen compounds,
e. antimony trioxide, antimony carbonate, bismuth trioxide or bismuth carbonate and
f. finely divided tetrafluoroethylene polymer,
the tetrafluoroethylene polymer being introduced into the molding composition through an aqueous emulsion of the SAN graft polymer b. and, optionally, an aqueous emulsion of the thermoplastic polymer c., so that favorable surfaces of the molding compositions are obtained.

According to page 16 OF DE-OS 3,322,260, this principle of incorporating tetrafluoroethylene polymers may be applied to any polycarbonate-containing molding compositions.

So far as the difficulty of processing polytetrafluoroethylenes is concerned, reference is also made to FR-PS 1,412,767 and, regarding the incorporation of polytetrafluoroethylenes in thermoplasts, such as aromatic polycarbonates or polymers of unsaturated monomers, to US-PS 3,294,871 and also to US-PS 3,005,795, more especially columns 3/4, where precipitation and coagulation are mentioned.

The antistatic finishing of optionally rubber-modified polymers based on aromatic vinyl compounds and other vinyl monomers, such as for example, ABS and SAN, has been known for years. The antistatic agents recommended include, for example, alkyl and aryl sulfonates (DOS 1,544,652), amines (DE-PS 1,258,083), salts of quaternary ammonium compounds, amides, polyethers (DE-PS 1,244,398) and phosphorus compounds, such as phosphorus acids and phosphonates. However, these compounds are unsuitable as antistatic agents for the molding compositions in question here.

For example, it has been found that the alkoxylated amines (according to DE-PS 1,258,083) which have been successfully used in practice for styrene polymers promote the molecular weight degradation of thermoplastic polycarbonates (cf. for example D. Margotte in Ullmanns Encyclopädie der techischen Chemie, 4th Edition, Vol. 19, page 55, Verlag Chemie, Weinheim 1980 and H. Krimm in Methoden der organischen Chemie (Houben-Weyl), 4th Edition, Vol. XIV.2, page 48, Thieme Verlag, Stuttgart 1963), while the antistatic agents normally used for aromatic polycarbonates, such as for example sulfonic acid salts (DOS 2,931,172 and DOS 3,004,017), are again not sufficiently active in styrene polymers.

Accordingly, the object of the present invention is to provide an effective antistatic agent which may be used both for styrene polymers and for aromatic polycarbonates and hence, and in particular, for mixtures of both.

According to the invention, this object is achieved by using polyalkylene ethers modified by treatment with a radical former. The antistatic agents obtained are distinguished by high effectiveness without adversely affecting other properties, such as mechanical strength, surface gloss and processibility.

Thermoplastic aromatic polycarbonates A suitable for the purposes of the invention are those based on diphenols corresponding to the following formula

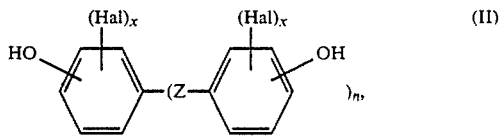

in which Z is a single bond, a $C_1$-$C_5$ alkylene radical, a $C_2$-$C_5$ alkylidene radical, a $C_5$-$C_6$ cycloalkylidene radical, —S— or —$SO_2$—, Hal is chlorine or bromine, x=0, 1 or 2 and n=1 or 0, and, optionally, to the following formula

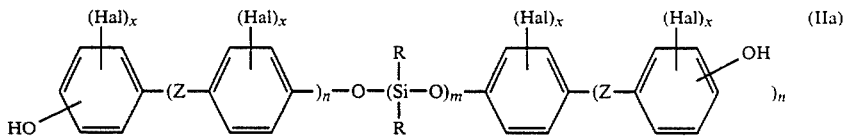

in which Z, Hal, x and n are as defined for formula (II) and the substituents R may be the same or different and represent linear $C_1$-$C_{20}$ alkyl, branched $C_3$-$C_{20}$ alkyl, $C_6$-$C_{20}$ aryl, preferably $CH_3$, and m is an integer of 5 to 100 and preferably of 20 to 80.

Polycarbonates A, suitable for the purposes of the invention are homopolycarbonates and copolycarbonates, the diphenols corresponding to formula (IIa) only being used for the production of copolycarbonates with the diphenols of formula (II) and their proportion by weight in the copolycarbonates being from 1 to 20% by weight, preferably from 1.5 to 15% by weight and more preferably from 2 to 10% by weight, based in each case on the total weight of the diphenols of formulae (II) and (IIa).

Component A may also consist of mixtures of the thermo-plastic polycarbonates defined above. Where the mixtures are mixtures with polydiorganosiloxane-polycarbonate block copolymers, the proportion by weight of the diphenols (IIa), based on the total sum of the diphenols in the polycarbonate mixture, is between 1 and 20% by weight.

The polycarbonates A suitable for the purposes of the invention are known and may be produced, for example, with phosgene by the interfacial method of which phosgene by the homogeneous-phase method, the so-called pyridine method, the molecular weight being adjustable in known manner by known chain terminators. (For polydiorganosiloxane-containing polycarbonates, see DE-OS 3,334,873.)

Suitable chain terminators are, for example, phenol, p-chlorophenol, p-tert.-butylphenol or 2,4,6-tribromophenol and long-chain alkylphenols, such as 4-(1,3-tetramethylbutyl)-phenol according to DE-OS 2,842,005 or monoalkylphenol or dialkylphenols containing in all 8 to 20 carbon atoms in the alkyl substituents according to DE-OS 3,506,472, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The quantity of chain terminators to be used is generally between 0.5 mole % and 10 mole %, based on the sum of the particular diphenols (II) and, optionally, (IIa) used.

The polycarbonates A. suitable for the purposes of the invention have average weight-average molecular weights $\overline{M}_w$, as measured by ultracentrifugation or scattered-light measurement, of 10,000 to 200,000 and preferably 20,000 to 80,000.

Suitable diphenols of formula (II) are, for example, hydroquinone, resorcinol, 4,4'-dihydroxydiphenyl, 2,2-bis-(4-hydroxyphenyl)-propane, 2,4-bis-(4-hydroxyphenol)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, 2,2-bis-(3,5-dibromo-4-hydroxy-phenyl)-propane.

Preferred diphenols corresponding to formula (II) are 2,2-bis-(4-hydroxyphenyl)-propane, 2,2-bis-(3,5-dichloro-4-hydroxyphenyl)-propane and 1,1-bis(4-hydroxyphenyl)-cyclohexane.

Suitable diphenols corresponding to formula (IIa) are those in which R is methyl, ethyl, propyl, n-butyl, tert.-butyl or phenyl.

Preferred diphenols of formula (IIa) correspond to the following formula

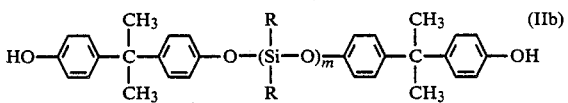
(IIb)

in which the substituents R are the same and have the meaning defined above, i.e. preferably methyl etc. or phenyl and m is an integer of 5 to 100 and preferably of 20 to 80.

The diphenols corresponding to formula (IIa) may be obtained from the corresponding bis-chlorine compounds corresponding to the following formula

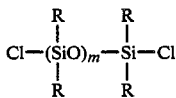
(III)

and the diphenols (II), for example in accordance with US-PS 3,419,634 in combination with US-PS 3,189,662.

In the bis-chlorine compounds (III), R and m have the same meaning as in the diphenols (IIa) and (IIb).

The polycarbonates A. suitable for the purposes of the invention may be branched in known manner, preferably through the incorporation of 0.05 to 2.0 mole %, based on the sum of the diphenols used, of trifunctional or more than trifunctional compounds, for example those containing three or more than three phenolic groups.

Besides bisphenol A homopolycarbonate, preferred polycarbonates are the copolycarbonates of bisphenol A with up to 15 mole %, based on the molar sum of diphenols, of 2,2-bis-(3,5-dibromo-4-hydroxyphenyl)-propane or the copolycarbonates of the diphenols (II) with 1 to 20% by weight of the diphenols (IIa), preferably the diphenols (IIb), based in each case on the total weight of the diphenols (II) and (IIa) or (II) and (IIb).

Rubbers suitable for the production of the graft polymers B. are, in particular, polybutadiene, butadiene/styrene copolymers (both also copolymerized with up to 30% by weight, based on the weight of the rubber, of a lower alkyl ester of acrylic or methacrylic acid, such as methyl methacrylate, ethyl acrylate, methyl acrylate or ethyl methacrylate), polyisoprene, polychloroprene, alkyl acrylate rubbers (of $C_1$–$C_8$ alkyl acrylates, more especially ethyl, butyl, ethylhexyl acrylate). The alkyl acrylate rubbers may optionally contain up to 30% by weight, based on the weight of the rubber, of monomers such as vinyl acetate, acrylonitrile, styrene, methyl methacrylate and/or vinyl ether in copolymerized form and also relatively small quantities, preferably up to 5% by weight, based on the weight of the rubber, of crosslinking, ethylenically unsaturated monomers. Such crosslinking agents are, for example, alkylenediol di(meth)acrylates, polyester di(meth)acrylates, divinylbenzene, trivinylbenzene, triallyl cyanurate, allyl (meth)acrylate, butadiene or isoprene. Other suitable acrylate rubbers are products which contain a crosslinking diene rubber of one or more conjugated dienes and, optionally, an ethylenically unsaturated monomer, such as styrene and/or acrylonitrile, as core. Other suitable rubbers are, for example, EPDM rubbers, i.e. rubbers of ethylene, propylene and an unconjugated diene.

Preferred rubbers for the production of the graft polymers B. are diene and alkyl acrylate rubbers.

The rubbers are present in the graft polymers B. in the form of at least partly crosslinked particles having an average diameter of 0.09 to 5 $\mu$m and preferably of 0.1 to 1 $\mu$m. The graft polymers B. are prepared by radical graft copolymerization of the monomer mixtures of B.1.1 and B.1.2 defined at the beginning in the presence of the rubbers B.2 to be grafted and are all known. Preferred methods for the production of the graft polymers B. are emulsion, solution, mass or suspension polymerization. Particularly preferred graft polymers B. are the so-called ABS polymers. Halogen styrenes and p-methyl styrene are mentioned as examples of nucleus-substituted styrenes.

Preferred copolymers C. are those of at least one of the monomers styrene, α-methyl styrene, halogen styrene according to C.1 with at least one of the monomers acrylonitrile, methacrylonitrile, methyl methacrylate, maleic anhydride according to C.2.

Copolymers C. are often formed as secondary products in the graft polymerization for the production of component B., particularly when large quantities of monomer are grafted onto small quantities of rubber.

The quantity of 5 to 70 parts by weight, based on 100 parts by weight of A.+C. and, optionally, B. and/or D., in which the copolymer C. is used in accordance with the invention does not include these secondary products of the graft polymerization.

The copolymers C. are resin-like, thermoplastic and rubber-free. Particularly preferred copolymers C. are those of styrene with acrylonitrile and, optionally, with methyl methacrylate, of α-methyl styrene with acrylonitrile and, optionally, with methyl methacrylate or of styrene and α-methyl styrene with acrylonitrile and, optionally, with methyl methacrylate.

Particularly preferred ratios by weight in the thermoplastic copolymer C. are 60 to 80% by weight C.1 and 40 to 20% by weight C.2.

The copolymers C. are known and may be prepared by radical polymerization, more especially by emulsion, suspension, solution or mass polymerization. The copolymers C. preferably have molecular weights $\overline{M}_w$ (weight average, as determined by light scattering or sedimentation) of from 15,000 to 200,000.

Organic halogen compounds D. suitable for the purposes of the invention include in principle any organic halogen compounds which are non-volatile and thermally stable, i.e. do not give off any halogen, in the production and processing of the molding compositions according to the invention so that they are able to perform their flameproofing function in the event of fire. Particularly suitable organic halogen compounds are decabromodiphenyl ether, octabromodiphenyl, octabromodiphenyl ether and tribromotetrachlorotoluene; oligomeric bromine compounds, such as for example oligocarbonates based on tetrabromobisphenol A and, finally, polymeric bromine compounds such as, for example, high molecular weight polycarbonates based on tetrabromobisphenol A or nucleus-brominated polyphenylene oxides.

Accordingly, the halogen content resulting from component D. may also be introduced through the high molecular weight polycarbonate of component A., the polycarbonate component A. having to contain the halogen content of 3 to 10% by weight in the absence of component D.

The phophorus compounds of component E. to be used in accordance with the invention are generally known (cf. for example Ullman, Encyclopädie der technischen Chemie, Vol. 18, pages 301 et seq., 1979).

Optionally halogenated $C_1$–$C_8$ alkyl radicals $R_1$, $R_2$ or $R_3$ in formula (I) are chloroethyl, 2-chloropropyl, 2,3-dibromopropyl, butyl, methyl and octyl.

Optionally halogenated $C_6$–$C_{20}$ aryl radicals $R_1$, $R_2$ or $R_3$ in formula (I) are chlorophenyl, bromophenyl, pentachlorophenyl, pentabromophenyl phenyl, cresyl, isopropylphenyl and naphthyl.

Phosphorus compounds of formula (I) suitable for use in accordance with the invention are tributylphosphate, tris-(2-chloroethyl)-phosphate, tris-(2,3-dibromopropyl)-phosphate, triphenylphosphate, tricresylphosphate, diphenyl cresylphosphate, diphenyl octylphosphate, diphenyl-2-ethyl cresylphosphate, tri(isopropylphenyl)phosphate, halogen-substituted arylphosphates, methanephosphonic acid dimethyl ester, methanephosphonic acid diphenyl ester and phenylphosphonic acid diethyl ester.

The tetrafluoroethylene polymers of component F. suitable for the purposes of the invention are polymers having fluorine contents of 65 to 76% by weight and preferably of 70 to 76% by weight. Examples are polytetrafluoroethylene, tetrafluoroethylene-hexafluoropropylene copolymers or tetrafluoroethylene copolymers containing small quantities of fluorine-free copolymerizable ethylenically unsaturated monomers. The polymers are known and may be produced by known methods, for example by polymerization of tetrafluoroethylene in aqueous medium with a catalyst forming free radicals, for example sodium, potassium or ammonium peroxydisulfate, under pressures of 7 to 71 kg/cm$^2$ and at temperatures of 0° to 200° C. and preferably at temperatures of 20° to 100° C. (For further particulars, see for example US-PS 2,393,967). Depending on the form in which they are used, these materials may have densities of 1.2 to 2.3 g/cm$^2$ and an average particle size of 0.05 to 1000 μm.

Polytetrafluoroethylenes preferably used in accordance with the invention have average particle sizes of 0.05 to 20 μm and preferably of 0.08 to 10 μm and a density of 1.2 to 1.9 g/cm$^3$ and are used in the form of a coagulated mixture of emulsions of the tetrafluoroethylene polymers F. with emulsions of the graft polymers B.

Suitable tetrafluoroethylene polymers F., which may be used in powder form, have particle sizes of, for example, 100 μm to 1000 μm and densities of 2.0 to 2.3 g/cm$^3$.

The addition of tetrafluoroethylene polymers above all reduces or completely prevents the dripping of the molten molding composition in the event of fire. In addition, its use in the form of a coagulated mixture improves the surface of moldings produced from the mixtures according to the invention, which is particularly important in the production of moldings of very large surface area and where production is carried out at very high processing temperatures.

To prepare a coagulated mixture of B. and F., an aqueous emulsion (latex) of a graft polymer B. having average latex particle sizes of 0.1 to 2 μm and more especially of 0.2 to 0.6 μm is first mixed with a finely divided emulsion of a tetrafluoroethylene polymer F. in water having average particle sizes of 0.05 to 20 μm and more especially from 0.08 to 10 μm. Suitable tetrafluoroethylene polymer emulsions typically have solids contents of 30 to 70% by weight and more especially of 50 to 60% by weight. The emulsions of the graft polymers B. have solid contents of 25 to 50% by weight and preferably of 30 to 45% by weight.

In the emulsion mixture, the ratio by weight of graft polymer B. to the tetrafluoroethylene polymer F. is 95:5 to 60:40. The emulsion mixture is then coagulated in known manner, for example by spray drying, freeze drying or coagulation by addition of inorganic or organic salts, acids, bases or organic water-miscible solvents, such as alcohols, ketones, preferably at temperatures of 20° to 150° C. and more especially at temperatures of 50° to 100° C. If necessary, drying may be carried out at 50° to 200° C. and preferably at 70° to 100° C.

Suitable tetrafluoroethylene polymer emulsions are commercially available products, being marketed for example by DuPont as Teflon ® 30 N.

Antistatic agents G. suitable for the purposes of the invention are polyalkylene ethers which have been treated with one or more radical-forming compounds. The polyalkylene ethers ("starting polyethers") to be modified in accordance with the invention are made up of difunctional and polyfunctional (cyclo)aliphatic radicals and, to a limited extent, may also contain olefinic groups. Suitable polyalkylene ethers are, for example, reaction products of diols or polyols, ethylene glycol, 1,2-propylene glycol, trimethylolpropane, glycerol, pentaerythritol, sorbitol and mannitol and one or more alkylene oxides, such as ethylene oxide and propylene oxide (for production and use, see Ullmanns Encyklopädie der technischen Chemie, 4th Edition, Vol. 19, page 31, Verlag Chemie, Weinheim 1980). Polyalkylene glycols containing high proportions of 1,2-propylene structures are preferred.

It is possible to use both linear and also branched polyalkylene glycols, moderately branched types being preferred.

The "starting" polyalkylene glycols have average molecular weights of 500 to 15,000, preferably of 1000 to 10,000 and more preferably of 2000 to 5000.

Suitable radical-forming compounds are compounds of the type commercially available as initiators for radical polymerization and any other compounds which decompose sufficiently quickly into radicals at temperatures of 20° to 200° C. For example, it is possible to use diacyl peroxides, such as dibenzoyl peroxide, substituted dibenzoyl peroxides and dilauryl peroxide, acylsulfonyl peroxides, such as acetyl cyclohexanesulfonyl peroxide, peroxydicarbonates, such as dicyclohexyl and di-tert.-butyl peroxydicarbonate, acyl per esters, such as tert.-butyl perpivalate and tert.-butyl perbenzoate, dialkyl peroxides, such as dicumyl and di-tert.-butyl peroxide, hydroperoxides, such as cumyl hydroperoxide and tert.-butyl hydroperoxide, and other peroxy compounds and also aliphatic and araliphatic azo compounds. Preferred radical formers decompose sufficiently quickly at temperatures of 60° to 140° C., for example azodiisobutyronitrile, di-tert.-butyl peroxide, dibenzoyl peroxide, tert.-butyl perbenzoate, dicumyl peroxide and 1,3-bis-(tert.-butylperoxyisopropyl)-benzene. Dibenzoyl peroxide is particularly preferred.

The radical formers are used in a quantity of 5 to 0.05% by weight, preferably in a quantity of 2.0 to 0.1% by weight and more preferably in a quantity of 1.0 to 0.25% by weight, based on the quantity of polyalkylene glycol.

The polyalkylene ethers modified in accordance with the invention may be prepared by simple stirring of the radical former with the particular polyalkylene glycol at temperatures of 50° to 150° C.

The modified polyalkylene ethers are generally medium-to high-viscosity, substantially clear liquids or colorless suspensions.

The molding compositions according to the invention may contain other known additives, such as stabilizers, pigments, flow aids and/or mold release agents.

The molding compositions according to the invention consisting of components A., C., E., F., G. and, optionally, B. and/or D. and, optionally, of other known additives, such as stabilizers, pigments, flow aids and/or mold release agents, are prepared by mixing the particular constituents in known manner and melt-compounding or melt-extruding the resulting mixtures at temperatures of 200° to 330° C. in standard mixing machines, such as internal kneaders, single-screw or twin-screw extruders, component F. preferably being used in the form of the already mentioned coagulation mixture.

Accordingly, the present invention also relates to a process for the production of thermoplastic molding compositions consisting of components A., C., E., F., G. and, optionally, component B., component E., stabilizers, pigments, flow aids and/or mold release agents, characterized in that components A., C., E., F., G. and, optionally, component B., D., stabilizers, pigments, flow aids and/or mold release agents are mixed and the resulting mixtures are melt-compounded or melt-extruded in standard machines at 200° to 330° C., component F. preferably being used in the form of a coagulated mixture with component B.

The individual constituents may be mixed in known manner either successively or simultaneously at a temperature of around 20° C. (room temperature) or even at a higher temperature.

The molding compositions according to the invention may be used for the production of moldings of any kind. More particularly, moldings may be produced by injection molding. Examples of moldings which may be produced from the molding compositions according to the invention include housing components of all kinds (for example for domestic appliances, such as juice presses, coffee machines, mixers), office machines or cover panels for the building industry and parts for motor vehicles. They may also be used in the field of electrical engineering by virtue of their favorable electrical properties.

Another form of processing is the production of moldings by deep drawing from prefabricated sheets or panels.

Particle sizes are always expressed as average particle diameters $d_{50}$, as determined by ultracentrifuge measurements in accordance with W. Scholtan et al., Colloids, u. Z. Polymere 250 (1972), 782–796.

EXAMPLES

Polycondensates and polymers used

A. A copolymer of bisphenol A with 10% by weight tetrabromobisphenol A having a relative solution viscosity of 1.284, as measured on a 0.5% by weight solution in $CH_2Cl_2$ at 25° C., bromine content: 5% by weight.

B. SAN graft polymer of 50% by weight of a mixture of styrene and acrylonitrile (ratio by weight 72:28) on 50% of particulate polybutadiene having an average particle size ($d_{50}$) of 0.4 μm obtained by emulsion polymerization.

C. Styrene-acrylonitrile copolymer with a styrene to acrylonitrile ratio of 72:28 and a limiting viscosity number $[\eta]$ of 0.55 dl/g (as measured in dimethylformamide at 20° C.).

E. Triphenylphosphate

F. Tetrafluoroethylene polymer in the form of a coagulated mixture of an SAN graft polymer emulsion in water and a tetrafluoroethylene polymer emulsion in water. The ratio by weight of graft polymer B. to tetrafluoroethylene polymer F. in the mixture is 90% by weight to 10% by weight. The tetrafluoroethylene polymer emulsion has a solids content of 60% and a particle size of 0.05 to 0.5 μm. The SAN graft polymer emulsion has a solids content of 34% by weight and a latex particle size of 0.3 to 0.4 μm.

Preparation of F.

The emulsion of the tetrafluoroethylene polymer was mixed with an emulsion of the SAN graft polymer B. and the resulting mixture stabilized with 1.8% by weight, based on polymer solids, of phenolic antioxidants. The mixture is coagulated at 85° to 95° C. with an aqueous solution of $MgSO_4$ (Epsom salt) and acetic acid at pH 4 to 5, filtered and washed until substantially free from electrolyte, subsequently freed from most of the water by centrifugation and then dried at 100° C. to form a powder. This powder may then be combined with the other components in the described machines.

The individual components were compounded in a 3 liter internal kneader at a temperature of 200° to 220° C.

The moldings were produced in an injection molding machine at 240° C.

The fire behavior of the test specimens was tested in accordance with UL Subj. 94 V in test specimen thicknesses of 1.6 mm. The UL 94 test is carried out as follows:

Substance samples are molded into bars measuring $127 \times 12.7 \times 1.6$ mm. The bars are vertically mounted in such a way that the underneath of the test specimen is situated 305 mm above a strip of bandaging. Each test bar is individually ignited by two successive ignitions of 10 seconds' duration, the burning properties after each ignition are observed and the test specimen subsequently evaluated. The test specimens are ignited with a Bunsen burner with a 10 mm (⅜ inch) tall blue flame of natural gas with a heat content of $3.73 \times 10^4 \text{ kJ/m}^3$ (1000 BTU per cubic foot).

The UL 94 V-O classification encompasses the properties described below of materials tested by the UL 94 test. The molding compositions in this class do not contain any test specimens which burn for longer than 10 seconds after each exposure to the test flame; their total after-flame time in the two exposures of each test specimen to the test flame is not longer than 50 s; they do not contain any test specimens which burn right down to the retaining clip fastened to the upper end of the test specimen; they do not contain any test specimens which ignite the bandaging material arranged beneath the test specimen through burning drops or particles; they also contain no test specimens which glow for longer than 30 seconds after removal of the test flame.

Other UL 94 classifications apply to test specimens which are less flame-resistant and self-extinguishing and which form burning drops or particles. Test specimens such as these are given classifications of UL-94, V-1, and V-2. F stands for "failed" and is the classification given to samples which have an after-flame time of $\geq 30$ s.

The deflection temperature under load according to Vicat (method B) was determined in accordance with DIN 53,460.

Notched impact strength was determined in accordance with DIN 53,456/ISO R 179 using bars measuring $50 \times 6 \times 4$ mm provided with a 2.7 mm deep V-shaped notch.

The dust test was carried out on plates measuring $90 \times 60 \times 3$ mm. The plates were dusted with aluminum powder immediately after injection molding and after storage for 14 days in a dust-free room and the formation of dust patterns visually evaluated.

The molding compositions were prepared by compounding a starting blend with the quantities of antistatic agents according to the invention shown in the following Table in accordance with the foregoing observations.

The starting blend has the following composition:
67.7 parts by weight A
12.2 parts by weight B
20.1 parts by weight C
and, based on 100 parts by weight A.+B.+C.,
11.6 parts by weight E
4.2 parts by weight F Titanium dioxide was used as pigment in a quantity of 2.5 parts by weight and pentaerythritol tetrastearate as mold release agent in a quantity of 1.0 part by weight, based in each case on A.+B.+C.

A product prepared as follows was used as the antistatic agent G.:

1.0 kg of a linear polypropylene glycol having an average molecular weight (number average) $\overline{M}_n$ of 2000 (OH value $56 \pm 1$) was degassed in vacuo while heating to 120° C. and saturated with nitrogen. 6.6 g commercial dibenzoyl peroxide are added at a temperature of $<40°$ C. and the resulting mixture heated under nitrogen for 8 hours to 80°–85° C.

The following Table shows that the antistatic agents according to the invention affect the most important product properties, such as flame resistance, toughness and deflection temperature under load, only negligibly, if at all.

| Starting blend (parts by weight) | G. | UL-94 V (1.6 mm) | Notched impact strength kJ/m² | Vicat B₁₂₀· C. | Dust test (dust pattern formation) | |
|---|---|---|---|---|---|---|
| | | | | | Immediately after injection molding | after 14 days |
| Test according to the invention 119.3 | 1.5 | VO | 13 | 89 | none | none |
| Comparison test 119.3 | — | VO | 18 | 92 | extensive | extensive |

We claim:
1. Thermoplastic molding composition containing
A. 20 to 90 parts by weight of a thermoplastic aromatic polycarbonate,
B. 0 to 50 parts by weight of a graft polymer of
B.1. 5 to 90 parts by weight of a mixture of
B.1.1. 50 to 95% by weight styrene, α-methyl styrene, nucleus-substituted styrene, methyl methacrylate or mixtures thereof and
B.1.2 50 to 5% by weight (meth)acrylonitrile, methyl methacrylate, maleic anhydride, N-substituted maleic imide or mixtures thereof, on
B.2 95 to 10 parts by weight of a rubber having a glass transition temperature $T_G$ of $\leq 10°$ C.,
C. 5 to 70 parts by weight of a thermoplastic copolymer
C.1. 50 to 95% by weight styrene, α-methyl styrene, nucleus-substituted sytrene, methyl methacrylate or mixtures thereof and
C.2. 50 to 5% by weight (meth)acrylonitrile, methyl methacrylate, maleic anhydride, N-substituted maleic imide or mixtures thereof,
D. 0 to 15 parts by weight of a low molecular weight or high molecular weight bromine compound, based on 100 parts by weight of A.+B+C. and D. selected from the group consisting of decabromodiphenylether, octabromodiphenyl, octabromodiphenylether, tribromotetrachlorotoluene, oligocarbonates based on tetrabromobisphenol-A, high molecular weight polycarbonates based on tetrabromobisphenol-A and nucleus brominated polyphenylene oxides, the bromine content resulting from components A.+D. being between 3 and 10% by weight, based on the total weight of components A.+D.,
E. 1 to 20 parts by weight, based on 100 parts by weight A.+C. and, optionally, B. and/or D., of a phosphorus compound corresponding to the following formula

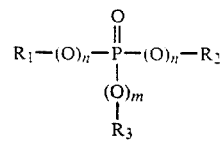

in which $R_1$, $R_2$ and $R_3$ independently of one another are an optionally halogenated $C_1$-$C_8$ alkyl or an optionally halogenated $C_6$-$C_{20}$ aryl and n and m independently of one another have the value 0 or 1, F. 0.05 to 1.0 part by weight, based on 100 parts by weight A.+C. and, optionally, B. and/or D., of a tetrafluoroethylene polymer having average particle sizes or 0.05 to 1000 μm and a density of 1.2 to 2.3 g/cm³ and G. 0.2 to 5.0 parts by weight, based on 100 parts by weight of the sum of A. to G. of a modified polyalkylene ether which comprises reacting a starting polyalkylene glycol ether with an average molecular weight of 500 to 15,000 with a peroxide or azo radical former in a quantity of 5 to 0.05% by weight based on the quantity of starting polyalkylene glycol ether by stirring the radical former with the starting polyalkylene glycol ether at temperature of 50° to 150° C., until a medium to high viscosity substantially clear liquid or colorless suspension is obtained, wherein the starting polyalkylene glycol is the reaction product of ethylene glycol, 1,2-propylene glycol, trimethylol-propane, glycerol, pentaerythritol, sorbitol or mannitol and alkylene oxide comprising ethylene oxide or propylene oxide.

2. Molding compositions as claimed in claim 1, characterized in that component F. is used in the form of a coagulated mixture of emulsions of the tetrafluoroethylene polymers F. having an average particle size of 0.05 to 20 μm and a density of 1.2 to 1.9 g/cm³ with emulsions of graft polymers B., the ratio by weight of graft polymer B. to the tetrafluoroethylene polymer F. being between 95:5 and 60:40 and the content of optionally additional quantities of B. based on 100 parts by weight of A.+C. and, optionally, B. and/or D., being between 0.1 and 4.0 parts by weight.

3. Molding compositions as claimed in claim 1, characterized in that the tetrafluoroethylene polymer of component F. has average particle sizes of 100 to 1000 μm and a density of 2.0 to 2.3 g/cm³.

4. Molding compositions as claimed in claim 1, characterized in that component G. is used in quantities of 1.0 to 3.0 parts by weight.

5. Molding compositions as claimed in claim 1, characterized in that component B. consists of 30 to 80 parts by weight B.1 and 70 to 20 parts by weight B.2.

6. Molding compositions as claimed in claim 1, characterized in that component E. is used in quantities of from 2 to 15 parts by weight.

7. Molding compositions as claimed in claim 1, characterized in that component F. is used in quantities of 0.1 to 0.5 part by weight.

8. Molding compositions as claimed in claim 1, consisting of components A., C., E., F., G. and, optionally, B. and/or D. and, in addition, of at least one additive selected from the group comprising stabilizers, pigments, flow aids and mold release agents.

9. Molding compositions as claimed in claim 1 wherein component G. is modified by a radical former in a quantity of 2.0 to 0.1% by weight.

10. Molding compositions as claimed in claim 1 wherein component G. is modified by a radical former in quantity of 1.0 to 0.25% by weight.

* * * * *